US011980201B2

(12) United States Patent
Verbruggen et al.

(10) Patent No.: US 11,980,201 B2
(45) Date of Patent: May 14, 2024

(54) OVEN WITH SMOKE SUPPLY

(71) Applicant: GEA Food Solutions Bakel B.V., Bakel (NL)

(72) Inventors: Paulus Johannes Verbruggen, Helmond (NL); Jacobus Petrus Hubertus Haex, Deurne (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 1206 days.

(21) Appl. No.: 16/616,705

(22) PCT Filed: Jun. 25, 2018

(86) PCT No.: PCT/EP2018/066940
§ 371 (c)(1),
(2) Date: Nov. 25, 2019

(87) PCT Pub. No.: WO2018/234581
PCT Pub. Date: Dec. 27, 2018

(65) Prior Publication Data
US 2020/0404933 A1 Dec. 31, 2020

(30) Foreign Application Priority Data
Jun. 23, 2017 (EP) .................................... 17177589

(51) Int. Cl.
*A23B 4/052* (2006.01)
*A21B 3/04* (2006.01)
(Continued)

(52) U.S. Cl.
CPC ................ *A23B 4/052* (2013.01); *A21B 3/04* (2013.01); *A23L 5/17* (2016.08); *A47J 36/32* (2013.01);
(Continued)

(58) Field of Classification Search
CPC ....... A23B 4/0526; A23B 4/052; A23B 4/056; A47J 36/32; B65G 21/18; A23L 5/17
See application file for complete search history.

(56) References Cited

U.S. PATENT DOCUMENTS 3,847,069 A * 11/1974 Guibert ................. A47J 37/046
99/365
3,873,741 A * 3/1975 Melcer .................... A23L 27/27
426/314

(Continued)

FOREIGN PATENT DOCUMENTS

CN 101380169 A 3/2009
CN 103277795 A 9/2013
(Continued)

OTHER PUBLICATIONS

International Search Report and Written Opinion for International Application PCT/EP2018/066940, dated Aug. 23, 2018.
(Continued)

Primary Examiner — Sean M Michalski
(74) Attorney, Agent, or Firm — The Dobrusin Law Firm, P.C.

(57) ABSTRACT

The present invention relates to an oven comprising: •—a first and a second chamber and one heater per chamber to heat a gas which cooks a product, •—at least one gas circulation means, which establishes a gas circulation in one chamber, •—endless conveyor means for transporting products from an inlet through the chambers to the outlet, wherein the conveyor means are at least partially arranged in a helical path, •—separation means to separate the first and second chamber, wherein the conveyor means pass through the separation means, •—natural smoke gaseous supply which supplies gaseous smoke to at least one of the chambers, wherein the smoke supply is provided upstream from the circulation means.

13 Claims, 5 Drawing Sheets

(51) Int. Cl.
    *A23L 5/10* (2016.01)
    *A47J 36/32* (2006.01)
    *B65G 21/18* (2006.01)

(52) U.S. Cl.
    CPC .......... *B65G 21/18* (2013.01); *A23V 2002/00* (2013.01); *B65G 2207/24* (2013.01)

(56) References Cited

U.S. PATENT DOCUMENTS

| | | | | |
|---|---|---|---|---|
| 4,072,093 A * | 2/1978 | Zimmer | A21B 5/02 | 99/365 |
| 4,250,804 A * | 2/1981 | Saurenman | A23B 4/056 | 99/481 |
| 4,276,465 A * | 6/1981 | Flavio | A21B 1/42 | 432/239 |
| 4,558,196 A * | 12/1985 | Babasade | A23B 4/0526 | 99/481 |
| 4,588,598 A * | 5/1986 | Griffith | A23B 4/0526 | 99/474 |
| 5,512,312 A * | 4/1996 | Forney | A23L 5/15 | 426/243 |
| 5,599,471 A * | 2/1997 | Zaidman | A23B 4/052 | 219/400 |
| 5,713,267 A * | 2/1998 | Wilson | A47J 37/0629 | 99/482 |
| 5,967,027 A * | 10/1999 | Higashimoto | A23B 4/044 | 99/534 |
| 6,146,678 A * | 11/2000 | Caridis | A23L 5/17 | 426/523 |
| 6,203,834 B1 * | 3/2001 | Anders | A23B 4/052 | 426/289 |
| 2015/0245643 A1 * | 9/2015 | Kop | A23L 27/27 | 99/331 |
| 2015/0342227 A1 * | 12/2015 | Verbruggen | A21B 1/42 | 426/455 |
| 2017/0292713 A1 * | 10/2017 | Boedicker | F24C 15/006 | |
| 2019/0289864 A1 * | 9/2019 | Swayne | A23B 4/052 | |

FOREIGN PATENT DOCUMENTS

| | | | | |
|---|---|---|---|---|
| CN | 103312245 | A | | 9/2013 |
| CN | 104902759 | A | | 9/2015 |
| CN | 105299651 | A | | 2/2016 |
| CN | 205505294 | U | * | 8/2016 |
| CN | 205993475 | U | | 3/2017 |
| EP | 0859199 | A1 | | 8/1998 |
| KR | 0135581 | Y1 | * | 2/1999 |
| WO | 2014/048925 | A1 | | 4/2014 |
| WO | WO-2014048925 | A1 | * | 4/2014 ............ A23L 27/27 |

OTHER PUBLICATIONS

International Preliminary Report on Patentability, for International Application PCT/EP2018/066940, dated Jul. 9, 2019.
Chinese First Office Action for Chinese Application 201880042090.7, dated Feb. 26, 2021.
Preliminary Office Action dated May 12, 2022, for Brazilian Patent Application BR 11 2019 025410-2.

* cited by examiner

OVEN WITH SMOKE SUPPLY

The present invention relates to an oven comprising:
at least one chamber and at least one heater per chamber to heat a gas which cooks, dries and/or roasts a product,
at least one gas circulation means per chamber, which establishes a gas circulation in the chamber,
endless conveyor means for transporting products from an inlet through the chambers to the outlet, wherein the conveyor means are at least partially arranged in a helical path,
preferably separation means to separate a first and a second chamber, wherein the conveyor means pass through the separation means,
gaseous natural smoke supply which supplies gaseous smoke to the at least one of the chamber.

An oven of this type is for example known from U.S. Pat. No. 6,203,834 B1. However, there is a constant desire of the person skilled in the art to improve the smoke distribution and/or the safety of such ovens.

The problem is solved by an oven comprising:
at least one chamber and at least one heater per chamber to heat a gas which cooks, dries and/or roasts a product,
at least one gas circulation means per chamber, which establishes a gas circulation in the chamber,
endless conveyor means for transporting products from an inlet through the chambers to the outlet, wherein the conveyor means are at least partially arranged in a helical path,
preferably separation means to separate a first and a second chamber, wherein the conveyor means pass through the separation means,
gaseous natural smoke supply which supplies gaseous smoke to the at least one of the chamber,
wherein the smoke supply is provided upstream from the circulation means.

Due to the provision of the gaseous smoke supply upstream from the circulation means, an improved distribution and an improved safety is achieved.

The oven comprises at least one, preferably two chambers. In each chamber food products are cooked, dried, roasted and/or browned. In case there are two chambers, the two chambers can be separated from each other by separation means, so that different conditions in terms of dry-bulb temperature and/or humidity/dew-point temperature can be set in the two chambers. The separation means is for example a wall between the two chambers which is preferably sealed, more preferably hermetically sealed, against the housing of the oven. However, there is an opening/passage in the separation means, through which the conveyor means passes. Preferably, the separation means is insulated to reduce the heat transfer between the two chambers. The passage may be just an opening in the separation means or a duct that extends into at least one, preferably both chambers or connects two chambers. The chambers are preferably equal in size.

In one chamber, the product inlet is provided and in the same or another chamber the product outlet is located. In each chamber there is a gas, preferably air and/or water vapor, that is heated by a heater and preferably adjusted to a certain dry-bulb temperature. Each heater in each chamber is preferably controlled individually. The gas heats products to be cooked, dried and/or roasted by conduction and/or convection. The gas is preferably a mixture of air, water-vapor and here smoke.

The gas is circulated in each chamber, by circulation means, for example a fan, which takes, preferably sucks, the gas out of the chamber and forces it back into the same chamber. Each fan is preferably controlled individually. Preferably, there is at least one distributor per chamber, which distributes the circulating gas in the chamber, which is supplied by the circulation means. Preferably, the distribution takes place along the vertical height of the chamber. The distribution may be equal along the entire height of the chamber or may vary with the height of the chamber. Preferably, means are provided to control the distribution of the gas along the height of the chamber. Additionally, or alternatively, one collector per chamber is provided, which collects the circulating gas before it enters the circulation means. The collection preferably takes place at different vertical locations. The collection may be equal along the entire height of the chamber or may vary with the height of the chamber. Preferably, means are provided to control the collection of the gas along the height of the chamber.

Preferably, there is at least one heater per chamber, which can be operated individually, so that the dry-bulb temperature in each chamber can be adjusted in each chamber individually. The heater is preferably provided downstream from the circulation means. The dew-point temperature of the gas in each chamber may be equal or different. Each chamber may comprise an individual dew-point temperature that may be equal or different. By means of an inlet for a gas, preferably air, with a dew-point temperature lower than the gas in the respective chamber and/or a fluid, preferably steam, with a dew-point temperature higher than the gas in the respective chamber, the dew-point temperature in the respective chamber can be influenced.

The products are transported through the inventive oven by an endless conveyor means from an inlet through the chamber(s) to the outlet, wherein the conveyor means are at least partially arranged in a helical path. Preferably, the conveyor means comprises two helical paths, which are connected by a straight section, which is located in the vicinity of the separation means and here in the passage. This embodiment is particularly preferred in case there are two chambers. The conveyor means are preferably an endless conveyor belt, which, more preferably, is at least partially permeable for the process fluid. Preferably, the conveyor means are advanced continuously.

The oven preferably comprises dry-bulb-temperature- and/or humidity/dew-point temperature control means for controlling the dry-bulb-temperature and/or humidity/dew-point temperature of the fluid in each chamber, respectively. The dry-bulb temperature of the fluid is adjusted by a heater, here at least one, preferably two heater(s) per chamber which can be adjusted individually. The humidity/dew-point temperature of the fluid is adjusted by adding steam or fresh gas, preferably air, with a low humidity/dew-point temperature as described above.

According to the present invention, the oven comprises a gaseous natural smoke supply which supplies gaseous smoke to at least one, preferably both of the chambers. Natural smoke according to present invention means, that the smoke is not supplied as a liquid, but that the smoke is produced in a smoke generator, for example with woodchips and is then directly supplied to the inventive oven. The smoke generator can be within the oven or an external part beside the oven. Preferably, there are two or more smoke generators which supply the natural smoke. The smoke generator and the cooking/drying chamber(s) are connected with each other via one or more pipe(s).

In an embodiment of the invention based on an oven preferably comprising two different climate zones/chambers wherein the conveyor means comprising a helical path followed by a straight path followed by a second helical path, the food products will be treated with gaseous smoke in the first zone and treated and/or with gaseous smoke in the second zone. Preferably the climate conditions such as dry-bulb temperature- and/or humidity/dew-point temperature in both zones will be different.

Different processes can be applied in different zones/chambers within the oven. In an embodiment of the invention, the food products will be dried in the first zone/chamber and will be smoked by gaseous smoke in the second zone/chamber. In another embodiment of the invention the food products will be dried in the first zone/chamber and will be smoked by gaseous smoke and/or liquid smoke in the second zone/chamber. In a further embodiment of the invention the food products will be treated with liquid smoke in the first zone and/or gaseous smoke in the second zone or vice versa wherein the food products will be smoked with gaseous smoke in the first zone followed by a treatment with liquid smoke in the second zone.

According to the present invention, the gaseous natural smoke is supplied to the chamber upstream from the circulation means, relative to flow of the circulated gas. Preferably, the gaseous natural smoke is provided on and/or at the vicinity of the inlet of the circulation means. The gaseous natural smoke can be supplied under pressure or can be sucked into the circulation means.

The endless conveyor means, particularly its helical path is preferably provided around a preferably hollow drum, wherein each chamber preferably comprises one drum. Preferably, the drum comprises openings at its outer circumference through which the circulation is utilized. The openings are preferably distributed along the vertical height of the drum. The circulating gas can enter via these openings from the chamber into the drum or exit through these openings into the chamber. The smoke can be supplied to the inside of this drum. The top end of the drum is gas-wise preferably connected to the circulation means, e.g. the circulation means sucks gas out of the drum and forces it back into the same chamber from which it has been taken. The circulation means is preferably provided at the top of the drum or above the drum.

In case a collector/distributor, particularly a collector is provided, the gaseous natural smoke can be supplied to the inside of this collector/distributor. The top end of the collector/distributor is gas-wise preferably connected to the circulation means, e.g. the circulation means takes, preferably sucks, gas out of the collector/distributor and forces it back into the same chamber from which it has been taken. The circulation means is preferably provided at the top of the collector/distributor or above the collector/distributor.

In the circulation means, the gaseous natural smoke is mixed with the circulated gas, which is then provided back into the chamber, where it is preferably distributed.

According to a preferred embodiment, a pipe extends from the gaseous natural smoke supply into the drum and/or into the collector/distributor, preferably through the bottom cross section of the drum and/or collector/distributor.

Preferably, the inventive oven comprises a multitude of drums and/or a multitude of collector/distributors, particularly two drums per oven and two collectors/distributors per chamber. Through each drum and/or collector/distributor, gaseous natural smoke can be supplied to each camber. Preferably, the gaseous natural smoke supply to each drum and/or collector/distributor can be controlled individually. The adjustment can be carried out manually or automatically by control means and for example according to a certain recipe, which can be stored in a PLC. As soon as the recipe is changed, the oven can be adjusted automatically by the PLC.

This can be achieved by individually setting and/or adjusting the distance between the downstream end of the pipe and the inlet of the circulation means. The adjustment can for example be carried out by a telescopic tube.

Additionally, or alternatively, the inventive oven comprises at least one adjustable valve, which is set manually and/or by a PLC and/or, in case the natural smoke supply comprises a compressor, this compressor is preferably controlled.

According to a preferred embodiment, exhaust means are provided to remove gas from the oven, preferably from the inlet and/or outlet. With these exhaust means, it can be avoided that gas, for example containing smoke flows from the oven to the ambient.

Preferably, the oven comprises means to supply air from the ambient to the oven, at least one chamber/zone of the oven. The ambient air preferably has a lower temperature and/or a lower dew-point and/or lower smoke content than the gas in at least one chamber/zone of the oven. This preferred embodiment allows to adjust the smoke content and/or the temperature and/or the dew-point in at least one chamber/zone of the oven. In case air from the ambient is added, preferably exhaust gas is removed from the oven via at least one exhaust means.

Preferably, a controlled leakage between the two chambers/zones takes place. This controlled leakage can be induced by a pressure gradient between the two chambers and/or means provided in the connection between the two chambers. With the leakage, a temperature-dew-point-and/or smoke-concentration-gradient between the two chambers can be reduced.

Another subject matter of the present invention is a method to operate an oven comprising:
at least one chamber and at least one heater per chamber to heat a gas which cooks, dries and/or roasts a product,
at least one gas circulation means per chamber, which establishes a gas circulation in the chamber,
endless conveyor means for transporting products from an inlet through the chamber to the outlet, wherein the conveyor means are at least partially arranged in a helical path,
preferably separation means to separate a first and a second chamber, wherein the conveyor means pass through the separation means,
gaseous natural smoke supply (10) which supplies gaseous smoke to the at least one of the chamber,
wherein the smoke is supplied upstream from the circulation means.

The disclosure regarding this subject matter also applies to the other subject matters and ice versa. Preferably, exhaust means are provided to remove gas from the oven, preferably from the inlet and/or outlet.

Preferably, the method comprises supplying air from the ambient, preferably with a lower temperature and/or a lower dew-point and/or lower smoke content than the gas in at least one chamber/zone of the oven, to the oven, preferably only one chamber/zone of the oven.

Preferably, a controlled leakage between the two chambers/zones takes place.

Subsequently, the invention is now explained according to the attached figures. These explanations do not limit the scope of protection.

Figure 1:
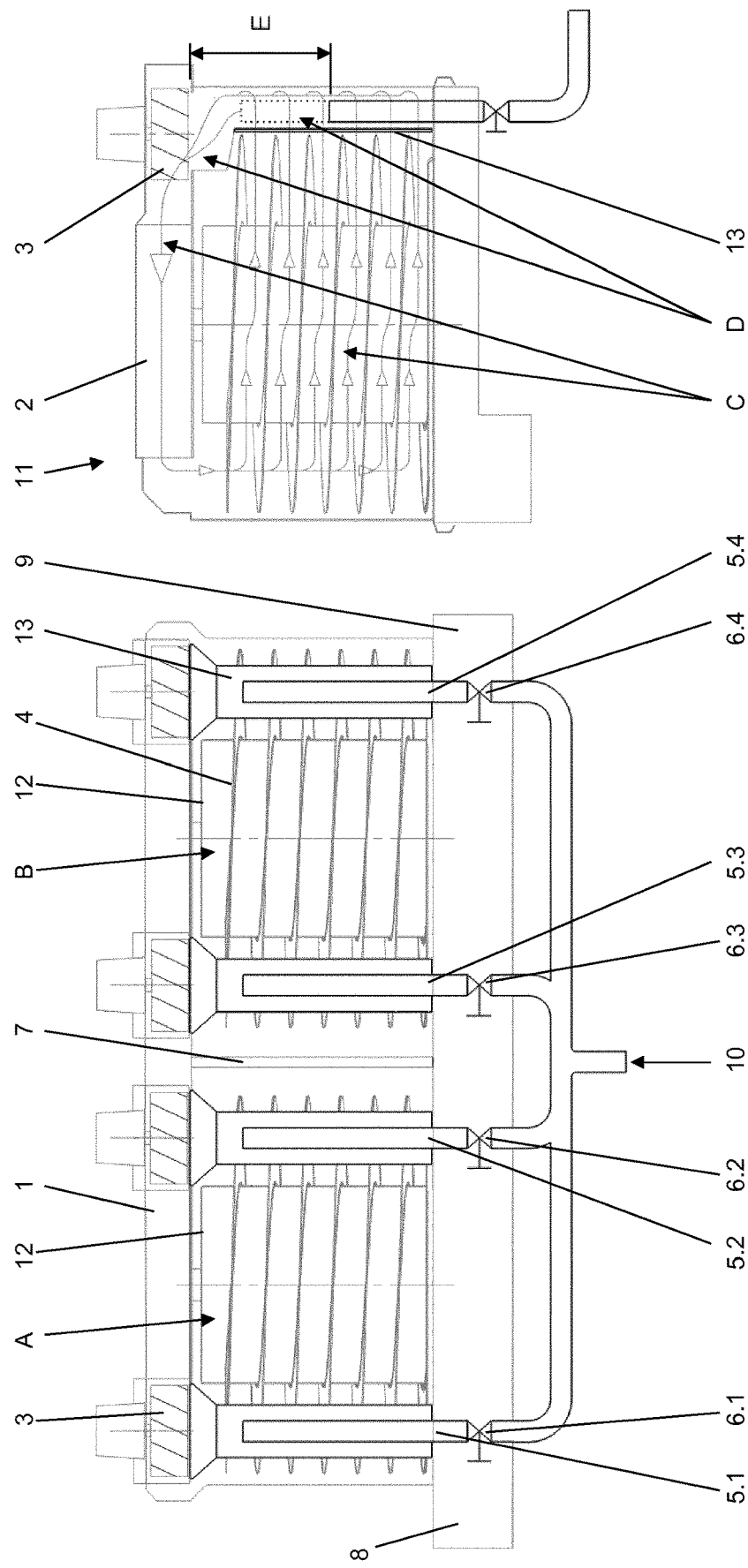
FIGS. 1-3 show an embodiment of the inventive oven.
Figure 2:
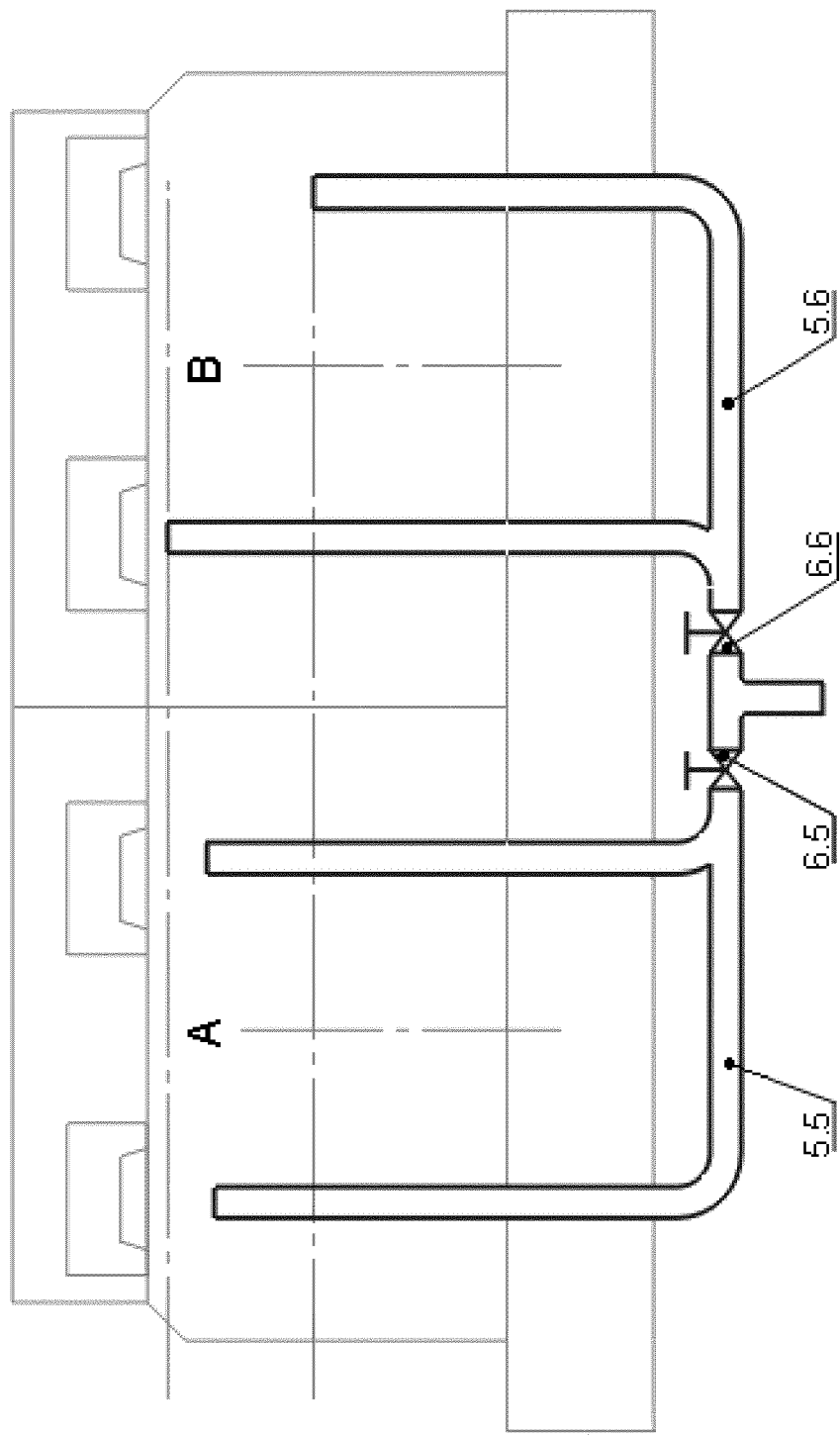
Figure 3:
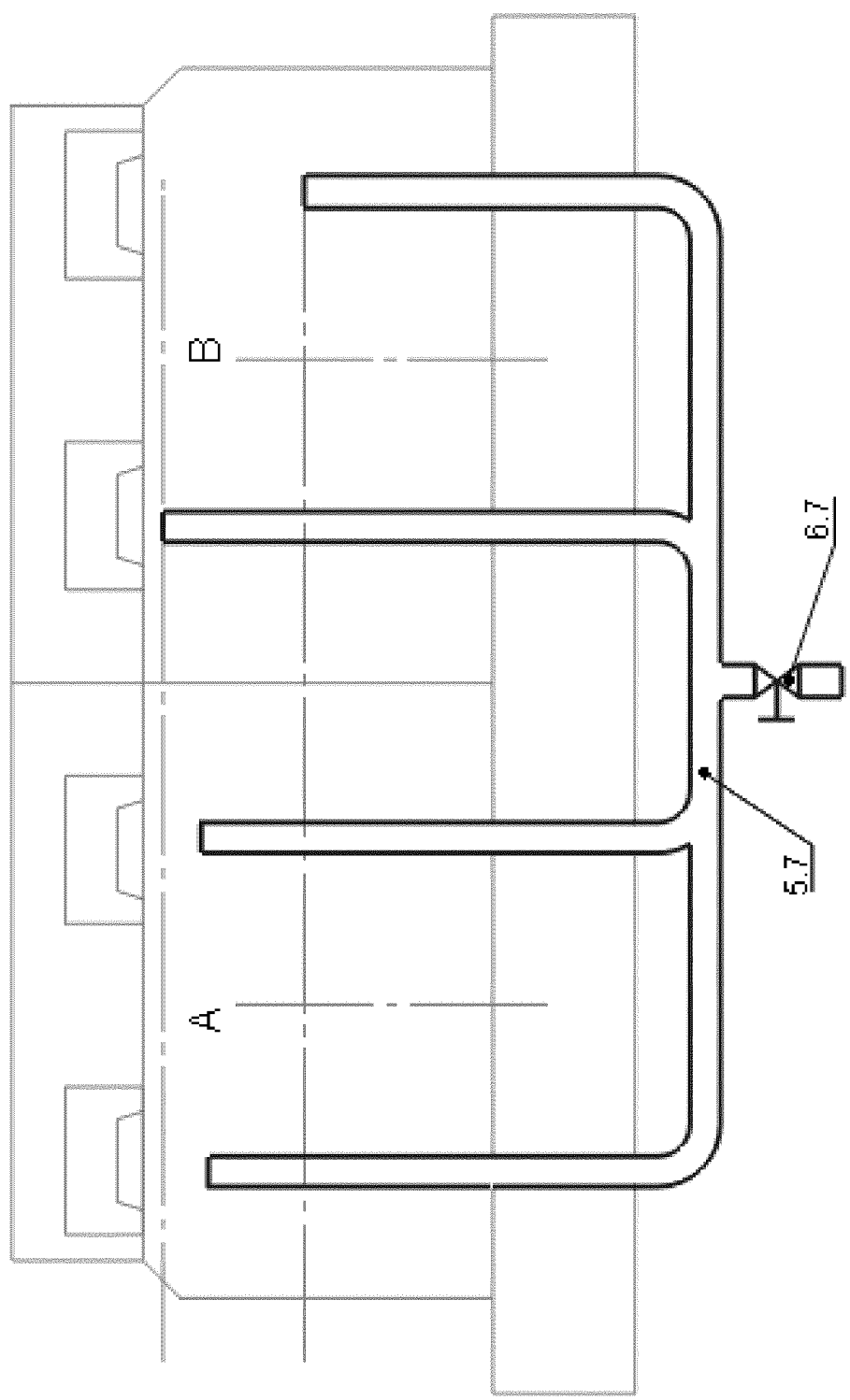

FIGS. 1-3 show the inventive oven. Here the oven 11 comprises a first chamber A and a second chamber B. The person skilled in the art understands, that one chamber A, B may be sufficient. The chambers are divided by a separation means 7, for example a metal wall, preferable an insulated separation means, which is sealed against the housing of the oven. The oven comprises conveyor means 4, which transport the products to be cooked, dried and/or roasted through the oven. The conveyor means 4 are here utilized by a helical transport belt in each chamber A, B, which are connected by a straight part in the vicinity of the partition 7. In case that only one chamber is provided, this chamber preferably comprises a helical transport belt. A rotatable drum 12 is arranged in each of these chambers, around which the conveyor belt 4 is guided along the helical paths. The endless conveyor belt enters the oven 11 via the inlet 8 in the housing of the oven, preferably by a straight conveyor belt section and leaves the oven 11 via the outlet 9 in the housing, likewise preferably by means of a straight section. The two helical sections are preferably connected by the straight conveyor belt section, which lies here at the top. In case only one chamber is provided, the outlet 9 is in the same chamber as the inlet. The belt is preferably permeable to the process gas, e.g. air and steam and here smoke. The separation means 7 comprise a passage for the belt section between the two helical paths. The conveyor means are preferably operated continuously.

The gas in the oven, preferably a mixture of air and vapor, is heated by heating means, which are overall denoted by 2, which are here arranged in the top of the housing. There is preferably one heating means per chamber, which, more preferably can be controlled individually. These heating means 2 each comprise at least one here two recirculation means 3, here two fans. Here, there are two recirculation means per chamber A, B, even though the person skilled in the art understands that one recirculation means per chamber may be sufficient. The fluid flow rate of each circulation means and hence the degree of recirculation can be adjusted individually. The gas, is taken from, preferably sucked up, by the circulation means 3 from each chambers A, B and forced back into the same chamber, A, B from which it has been taken.

In the present case, the chamber also comprises gas collector-/distribution means 13, here a vertical pipe/channel with openings, which are distributed along the height of the pipe/channel, which collects the gas from each chamber and provides it to the circulation means 3. In the present case two collector-/distribution means 13 are provided. Each collector-/distribution means 13 is here connected to an individual recirculation means 3.

In the present case, the gas enters the hollow section of the gas collector-/distribution means 13 via conveyor means 4 which transport the products and which are provided around the in this embodiment closed rotatable drum 12. The recirculation pass is illustrated by arrows which are marked by the reference sign C. The gas here flows past the heating element(s) 2 and is then recycled into the respective chamber A, B via the drum 12 of each chamber. Prior to the reintroduction of the gas into the respective chamber, the gas flow may be distributed according to a desired pattern, particularly over the vertical height of the drum, by distribution means, which are provided in the drum, for example as openings, whose cross-section is preferably adjustable to influence the distribution of the gas. The person skilled in the art understands that the flow path of the gas indicated by arrow C can also be the other way round, i.e. the gas is pressed into the distributor 13 and distributed by the distributor and then flows through the chamber and is collected by the drum. The inlet of the circulation means 3 is then connected to the inner diameter of the drum.

In the two chambers A, B different dry-bulb temperature- and/or humidity/dew-point temperature conditions can be set.

Inventively, the oven comprises a gaseous natural smoke supply 10, which provides smoke as a gas. The smoke is preferably produced by burning wood-chips or the like. Preferably no liquid smoke is used. The smoke is preferably produced by a smoke generator (not depicted) and is then, preferably immediately, used in the inventive oven. The smoke supply may comprise a compressor to increase the pressure of the gaseous natural smoke. The compressor is preferably controllable. The smoke supply 10 is connected to a pipe system, that directs smoke here to each chamber and in the present case at two different locations. The pipe system connects the hollow part of the gas collector-/distribution means 13 with the smoke supply and in the present case, each pipe extends into the hollow section of the gas collector-/distribution means 13. As can be particularly seen from FIG. 1, the length of the pipes and hence the distance E between downstream end of the pipe 5.1-5.4 and the inlet of the recirculation means is different. In case that at the suction side of the circulation means 3, there is a pressure level below ambient pressure, the driving force decreases with increasing distance E, and hence different amounts of smoke are sucked through each pipe. The pipe to the very right delivers least smoke, while the adjacent pipe delivers the largest amount of smoke. The two pipes to the left deliver the same amount of smoke, because their distance E is the same, assuming that the two circulation means 3 operate under the same condition.

Additionally, or alternatively, one or more valves 6.1-6.4 may be provided to manually or automatically adjust the amount of smoke provided through each pipe. Further additionally or alternatively, the pressure at which the natural gaseous smoke is provided can be controlled in order to modify the allover supply and/or the distribution to the pipe 5.1-5.4. In an alternative embodiment the amount of smoke can be reduced by connecting reducing means such as a cone element to the smoke pipes 5.1-5.4, preferably at the top end of the pipe there where the gaseous smoke exits the smoke pipes.

In the embodiment according to FIG. 3, there is only one central valve 6.7, which controls the overall supply of smoke to the oven.

The smoke is provided together with the recirculating gas to the recirculation means, compressed by the recirculation means 3 and then heated by the heat exchanger 2 and is then recirculated back into the chamber from which it has been taken. Due to the supply of the smoke on the inlet side of the recirculation means, the newly added smoke is mixed well with the recirculating gas stream and no concentrated smoke can get to the ambient, because the pressure level at the upstream end of the circulation means is preferably lower than the ambient, as long as the recirculation means 3 operates.

Figure 4:
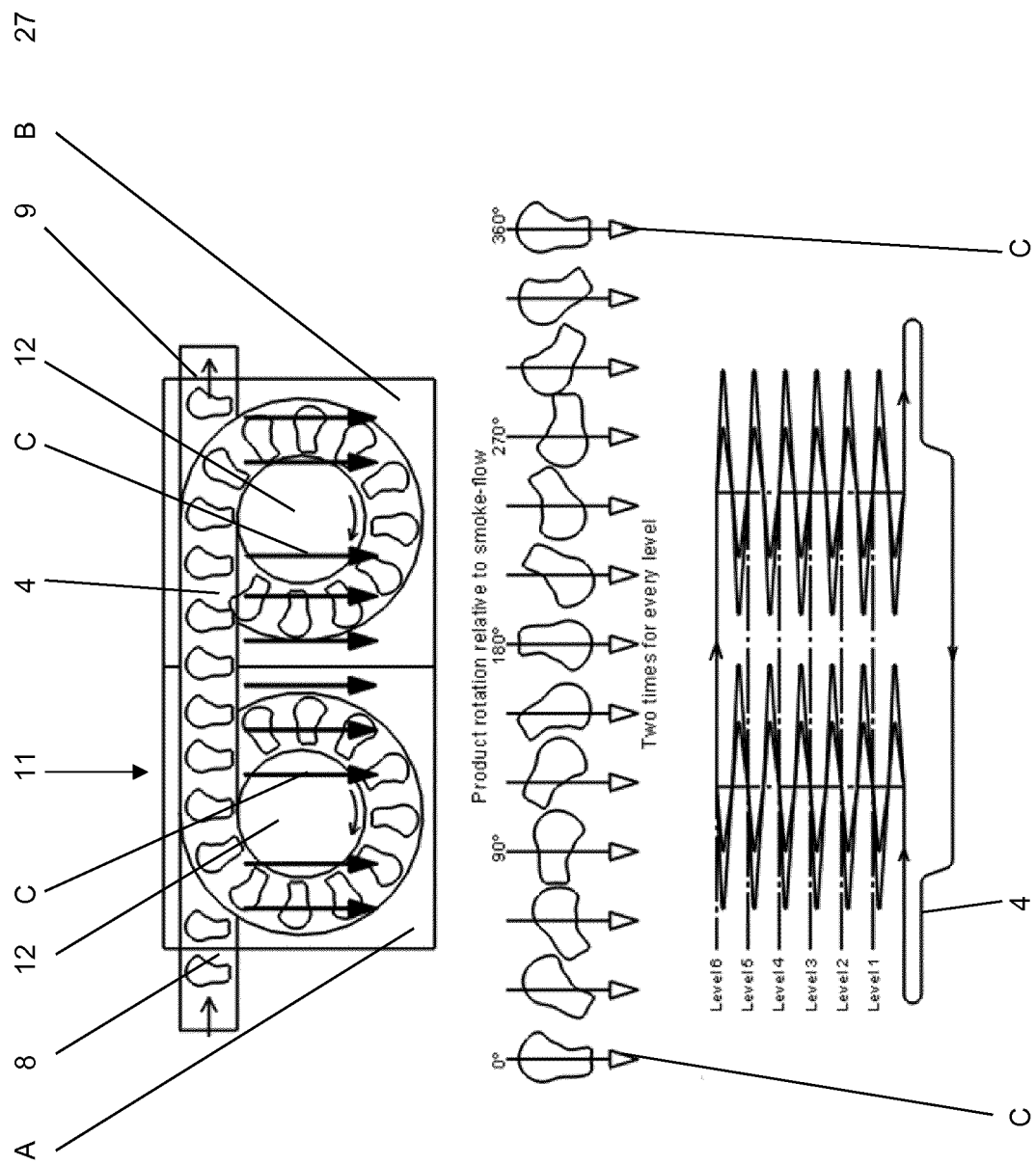
FIG. 4 shows an embodiment in which the smoke-flow is directed in a certain way.

The flow pattern of the recirculating stream and hence the smoke is depicted in FIGS. 1 and 4. It can be seen that the flow is directed essentially horizontally past the different levels of the helical path. At the present example, the flow is directed from the outside of the helical to the inside. Since, as depicted in FIG. 4, the products 27 for instance meat products turn on the helical path relative to the flow direction of the smoke, the degree of smoking of all parts of the products is equalized.

Figure 5:
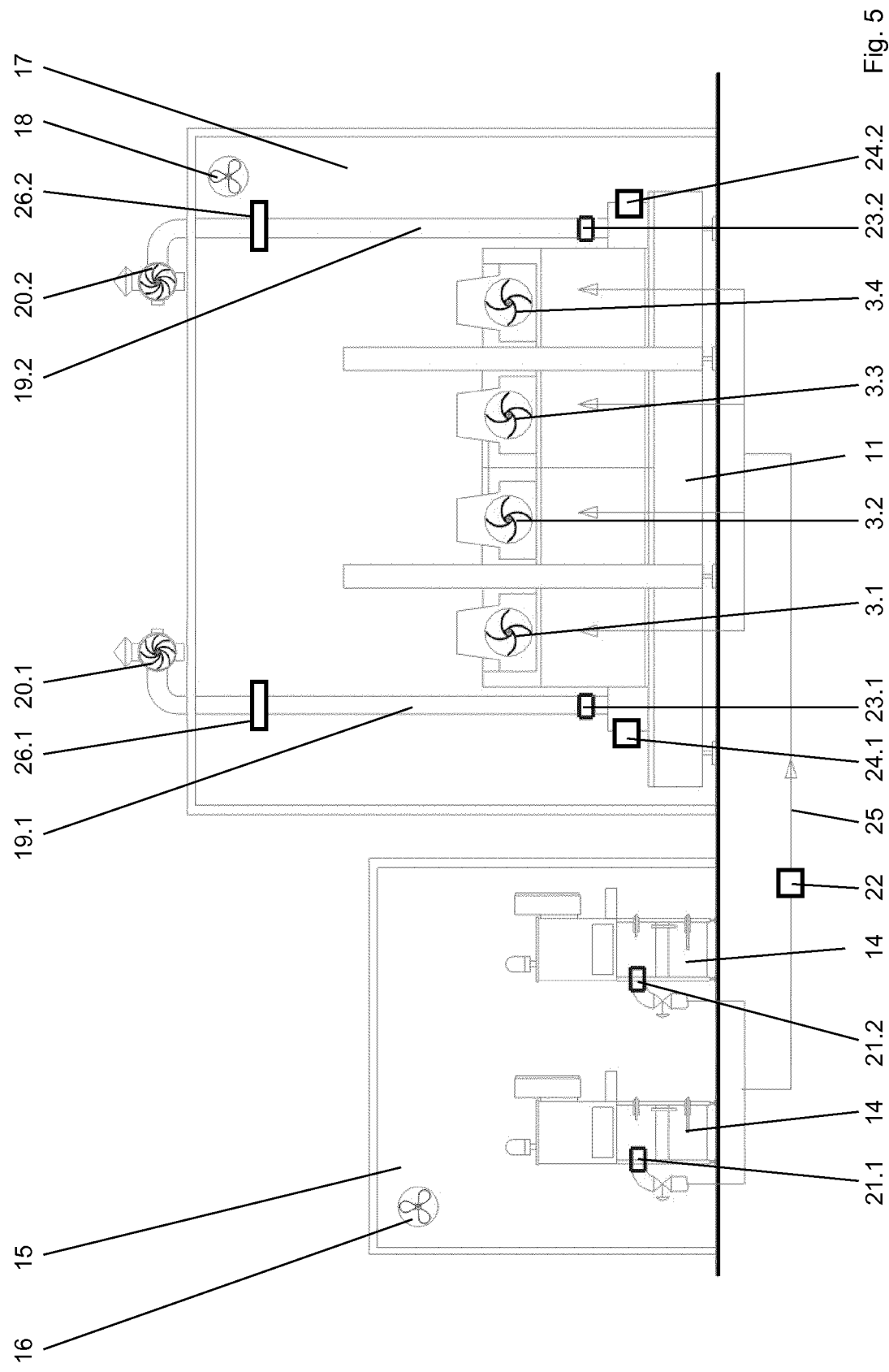

FIG. 5 depicts an embodiment wherein smoke generator 14 is preferably not be located within production room 17 which comprises oven 11 but preferably in a separated production room 14. This can prevent that combustion gases generated by smoldering wood chips within the smoke generator, enter the production room 17.

In a preferred embodiment smoke generator 14 sensing means 22 such as pressure means are provided in the smoke supply line 25 from the smoke generator to the oven. In case pressure means are provided, for example a pressure drop can be measured over the supply line within the smoke generator and/or over the supply line from the smoke generator to the oven and/or at other locations within the smoke supply to the oven. Depending on the pressure drop the smoke supply can be reduced and in case a predetermined pressure drop will be exceeded combustion within the smoke generator can be stopped by, for example, stopping the oxygen/fresh air supply to the combustion chamber and/or by extinguishing the combustion chamber.

In another or additional preferred embodiment the ratio fresh air/combustion gases supplied to the oven 11 will be directly measured and/or determined by measuring the gas composition, this ratio is preferably at least 20:1. Depending on the ratio of fresh air supply within smoke generator 14 and/or the combustion, the process can be controlled such that the ratio is maintained within a correct range. In case a predetermined ratio range is exceeded, such that, for example, too much combustion gas is within the smoke gases, for instance due to malfunction of the fresh air supply within the smoke generator, the smoke generator can be stopped. The supply of fresh air can be measured and/or determined preferably with means 21 such as pressure sensing means and/or volume flow measurement. Further detection means which can be used are carbon monoxide or carbon dioxide detectors. In case a predetermined value is exceeded, for instance the volume proportion of carbon monoxide exceeds a predetermined value the smoke generator can be stopped.

In a further preferred embodiment the supply of fresh air to/within the smoke generator will be such that air is supplied via one single air supply and will internally be divided by dividing means to respectively the combustion chamber and a distribution chamber. In the distribution chamber the smoke gases from the combustion chamber and fresh air will be mixed to the preferred ratio of at least 20:1. From the distribution chamber the resulting gaseous smoke will be supplied to the oven.

In yet another preferred embodiment the operation of fans 20.1 and 20.2 preferably positioned on the roof of the production facility can be monitored. Exhaust pipe 19.1 internally in communication with inlet 8 and exhaust pipe 19.2 internally in communication with outlet 9 of the oven can remove gases from oven 11, for example via suction by fans 20.1 respectively 20.2. In case fans 20.1 and 20.2 don't operate property gases from the oven will flow via inlet 8 and/or outlet 9 out of the oven into the production room 17. A proper operation of the fans can be determined by measuring the number of revolutions of the fans for instance with a pulse counter. In case the measured number of revolutions differentiates from a predetermined value the control unit will switch off the smoke generator.

In another preferred embodiment the gas flow within exhaust pipes 19.1 and 19.2 can be measured with sensing means 23.1 respectively 23.2. In case fans 20.1 and 20.2 operate property and/or valve means 26.1 and 26.2 are sufficiently opened, the control unit can, in case the volumetric flow rate and/or pressure drop is below a predetermined value, conclude that leakage of gases from the oven, for example, via inlet 8 and/or outlet 9 and/or eventually supplied fresh air intake openings of the oven to production room 17 occurs. In this case the smoke generator can be switched off.

In a further preferred embodiment sensing means 24.1 can be located within/outside inlet 8 and/or sensing means 24.2 located within/outside outlet 9 of oven 11 such as means to detect the ratio combustion gases/fresh air will be applied. Other detection means which can be used are carbon monoxide or carbon dioxide detectors. In case the composition of gases is not according a predetermined value range the smoke generator should be controlled such that the gas composition should be corrected and/or the smoke generator should be switched off.

In another preferred embodiment sensing means 24.1 and/or 24.2 are able to detect leakage of gases out of inlet 8 and/or outlet 9. In case one or more of the sensing means, for instance a temperature sensor and/or a pressure sensor senses that a predetermined value is exceeded, valves 26.1 and 26.1 within the exhaust pipes can be opened and/or further opened in order to control the exhaust of gases until the sensed value is within a predetermined value range. In case the predetermined value range exceeds the smoke generator is switched off. The temperatures during the smoking process within the respective chamber can be preferably in the range of 60° C.-120° C., much lower than in a regularly oven environment.

The operation of fans 3 within the oven can be monitored by sensing means such as the fan motor revolution. In case gas density (which can be part of the measurements) within the oven increases and the ratio fresh air/combustion gases exceeds a predetermined value, explosion danger can increase and the smoke generator is preferably switched off. In another embodiment the CIP (Clean In Place) supply line and connected CIP nozzles integrated in oven 11 to clean the oven can be used in an undesired situation such as in case fire is detected. Detection can be done by detection means such as a temperature sensor.

Sensing means 23 and/or 24 in combination with valve means 26 and fans 20 are further able to improve energy efficiency of the smoking process.

In case smoke, steam and/or ambient air is added to the oven, gas from one or both chambers can be removed from the oven via one or more exhaust means. The smoke, steam and/or ambient air addition to the oven can be utilized induce a desired leakage between the two chambers/zones of the oven.

REFERENCE SIGNS

1 Hood
2 Heater, Heat exchanger
3 Circulation means, fan
4 Endless conveyor means, endless belt
5 Smoke pipe (5.1-5.4, 5.7)
6 Control valve (6.1-6.4, 6.7)
7 Separation means, Partition means
8 Inlet
9 Outlet
10 Natural smoke supply
11 Oven
12 Drum
13 Collector/Distributor 14 Smoke generator
15 Production room comprising smoke generator 14
16 Air-conditioning in production room comprising smoke generator 14
17 Production room comprising oven 11
18 Air-conditioning in production room comprising oven 11
19 Exhaust pipe
20 Exhaust fan
21 Sensing means fresh air smoke generator 14
22 Sensing means supply line smoke generator 14
23 Sensing means exhaust gases oven 11
24 Sensing means within/outside inlet oven and/or within/outside outlet oven 11
25 Supply line smoke generator to oven 11
26 Valve means in exhaust pipe 19
27 Food product, Feed product, Meat product
28
A Zone 1, Chamber 1
B Zone 2, Chamber 2
C Gas-circulation, air circulation
D Upstream zone, Suction zone of the circulation means
E Pipe distance, variable pipe distance

The invention claimed is:

1. Oven comprising:
   at least one chamber, the at least one chamber comprising at least one heater that is configured to heat a gas to cook, dry, and/or roast a product, the at least one chamber comprising at least one gas circulation means that is configured to establish a gas circulation in the at least one chamber, the at least one chamber comprises a drum,
   an endless conveyor that is configured to transport products from an inlet of the at least one chamber to an outlet of the at least one chamber, the endless conveyor is at least partially arranged in a helical path,
   separation wall to separate a first chamber and a second chamber, the endless conveyor is configured to pass through a passage in the separation wall,
   a gaseous natural smoke supply that is configured to supply gaseous smoke to the at least one chamber, the gaseous natural smoke supply is provided upstream from the at least one gas circulation means,
   a collector/distributor, that is configured to collect and/or distribute the gas in the at least one chamber, and
   a pipe that connects the gaseous natural smoke supply with the collector/distributor and is configured to supply the gaseous smoke to an inside of the collector/distributor, and
   wherein a distance between an end of the pipe and an inlet of the at least one gas circulation means is adjustable.

2. Oven according to claim 1, wherein the oven comprises two chambers.

3. Oven according to claim 1, wherein the endless conveyor is provided around the drum, the drum is hollow.

4. Oven according to claim 3, wherein the gaseous smoke is supplied to the inside of the drum.

5. Oven according to claim 1, wherein the gaseous smoke is supplied to the collector/distributor.

6. Oven according to claim 1, wherein the oven comprises a controllable smoke supply system, which comprises at least one adjustable valve and/or adjustable smoke supply means.

7. Oven according to claim 1, wherein the oven comprises an exhaust means that is configured to remove the gas from the oven, the gas is removed from the inlet and/or the outlet.

8. Oven according to claim 1, wherein the oven comprises means to supply air from an ambient, the ambient having a lower temperature and/or a lower dew-point and/or lower smoke content than the gas in the at least one chamber of the oven, to the oven, or to only one of the at least one chamber of the oven.

9. Oven according to claim 1, wherein the oven comprises two chambers, and a controlled leakage between the two chambers takes place.

10. Method to operate an oven comprising:
    heating a gas with at least one heater which cooks, dries and/or roasts a product in at least one chamber, the at least one chamber comprises a drum,
    establishing a gas circulation in the at least one chamber of the overt with at least one gas circulation means,
    transporting products from an inlet through the at least one chamber to an outlet of the at least one chamber with an endless conveyor, the endless conveyor is at least partially arranged in a helical path, the oven comprises a separation wall to separate a first chamber and a second chamber, the endless conveyor is configured to pass through a passage in the separation wall,
    supplying gaseous smoke to the at least one chamber with a gaseous natural smoke supply, the gaseous smoke is supplied upstream from the at least one gas circulation means,
    collecting and/or distributing circulating gas in the at least one chamber with a collector/distributor,
    wherein a pipe extends into the collector/distributor to supply the gaseous smoke to an inside of the collector/distributor, and
    wherein a distance between an end of the pipe and an inlet of the at least one gas circulation means is adjusted.

11. Method according to claim 10, wherein an exhaust means are provided to remove the gas from the oven, the gas is removed from the inlet and/or the outlet.

12. Method according to claim 10, wherein the oven comprises means to supply air from an ambient, the ambient has a lower temperature and/or a lower dew-point and/or lower smoke content than the gas in the at least one chamber of the oven, to the oven, or to only one of the at least one chamber of the oven.

13. Method according to claim 10, wherein a controlled leakage between two chambers takes place.

* * * * *